United States Patent
Jin et al.

(10) Patent No.: US 10,924,897 B2
(45) Date of Patent: *Feb. 16, 2021

(54) ELECTRONIC DEVICE FOR SUPPORTING PROFILE CALL AND PROFILE CALL METHOD

(71) Applicant: Samsung Electronics Co., Ltd., Gyeonggi-do (KR)

(72) Inventors: Jong Hyun Jin, Gyeonggi-do (KR); Gyu Bong Oh, Gyeonggi-do (KR); Sung Dong Kim, Gyeonggi-do (KR); Soon Hyun Cha, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/075,843

(22) PCT Filed: Feb. 6, 2017

(86) PCT No.: PCT/KR2017/001291
§ 371 (c)(1),
(2) Date: Aug. 6, 2018

(87) PCT Pub. No.: WO2017/135787
PCT Pub. Date: Aug. 10, 2017

(65) Prior Publication Data
US 2019/0045335 A1  Feb. 7, 2019

(30) Foreign Application Priority Data

Feb. 5, 2016  (KR) .................. 10-2016-0014700

(51) Int. Cl.
*H04W 4/16* (2009.01)
*H04W 80/10* (2009.01)
(Continued)

(52) U.S. Cl.
CPC ............ *H04W 4/16* (2013.01); *H04L 51/10* (2013.01); *H04L 51/32* (2013.01);
(Continued)

(58) Field of Classification Search
CPC ......... H04W 4/21; H04W 4/16; H04W 80/10; H04W 88/02; H04M 1/274508;
(Continued)

(56) References Cited

U.S. PATENT DOCUMENTS 6,101,395 A * 8/2000 Keshavachar ........ H04W 28/18
455/466
6,549,937 B1 * 4/2003 Auerbach ............... H04L 29/06
709/206
(Continued)

FOREIGN PATENT DOCUMENTS

EP        2 672 682        12/2013
KR     1020120009777        2/2012
(Continued)

OTHER PUBLICATIONS

European Search Report dated Sep. 21, 2018 issued in counterpart application No. 17747830.2-1218, 8 pages.
(Continued)

*Primary Examiner* — Jean A Gelin
(74) *Attorney, Agent, or Firm* — The Farrell Law Firm, P.C.

(57) ABSTRACT

An electronic device is disclosed. The electronic device may comprise: a communication circuit for supporting a call function; a memory for storing a database including contacts of a plurality of users, wherein the database contains a plurality of contact groups and a first user of the plurality of users belongs to a first contact group; and a processor configured to cause the communication circuit to transmit, to a user terminal of the first user, a request for a profile call,
(Continued)

which comprises a contact of the first user and information on images corresponding to the first contact group, when a user input to send a call to the first user is received.

14 Claims, 11 Drawing Sheets

(51) Int. Cl.
*H04W 88/02* (2009.01)
*H04L 29/06* (2006.01)
*H04L 12/58* (2006.01)
*H04L 29/08* (2006.01)
*H04M 3/42* (2006.01)
*H04M 1/57* (2006.01)
*H04M 1/725* (2021.01)
*H04M 1/27453* (2020.01)
*H04M 3/436* (2006.01)
*H04W 4/21* (2018.01)

(52) U.S. Cl.
CPC ...... *H04L 65/1006* (2013.01); *H04L 65/1016* (2013.01); *H04L 67/141* (2013.01); *H04L 67/306* (2013.01); *H04M 1/27453* (2020.01); *H04M 1/57* (2013.01); *H04M 1/72519* (2013.01); *H04M 3/42042* (2013.01); *H04M 3/42068* (2013.01); *H04M 3/42076* (2013.01); *H04M 3/42153* (2013.01); *H04M 3/436* (2013.01); *H04W 80/10* (2013.01); *H04W 88/02* (2013.01); *H04M 2207/185* (2013.01); *H04W 4/21* (2018.02)

(58) Field of Classification Search
CPC ............... H04M 1/72519; H04M 1/57; H04M 3/42042; H04M 3/42068; H04M 3/42153
See application file for complete search history.

(56) References Cited

U.S. PATENT DOCUMENTS

| | | | |
|---|---|---|---|
| 7,940,908 B2 | 5/2011 | Sprigg et al. | |
| 8,295,207 B2 | 10/2012 | Stille et al. | |
| 8,605,880 B2 | 12/2013 | Sprigg et al. | |
| 8,892,167 B2* | 11/2014 | Deng | H04L 51/28 |
| | | | 455/566 |
| 9,247,428 B2 | 1/2016 | Sankaranarayanan et al. | |
| 9,622,056 B2 | 4/2017 | Hwang et al. | |
| 2003/0043974 A1* | 3/2003 | Emerson, III | H04L 29/06 |
| | | | 379/88.13 |
| 2003/0095510 A1 | 5/2003 | Dorenbosch | |
| 2004/0093317 A1* | 5/2004 | Swan | H04M 3/42365 |
| 2004/0235520 A1* | 11/2004 | Cadiz | G06F 3/04842 |
| | | | 455/557 |
| 2005/0210104 A1* | 9/2005 | Torvinen | H04L 67/18 |
| | | | 709/205 |
| 2005/0226230 A1 | 10/2005 | Dorenbosch | |
| 2006/0035632 A1* | 2/2006 | Sorvari | H04M 1/72547 |
| | | | 455/418 |
| 2007/0047523 A1* | 3/2007 | Jiang | H04L 67/26 |
| | | | 370/352 |
| 2007/0206736 A1 | 9/2007 | Sprigg et al. | |
| 2007/0293212 A1 | 12/2007 | Quon et al. | |
| 2008/0279119 A1* | 11/2008 | Stille | H04L 65/1069 |
| | | | 370/261 |
| 2009/0098863 A1* | 4/2009 | Wang | H04M 3/42017 |
| | | | 455/414.1 |
| 2009/0143052 A1 | 6/2009 | Bates et al. | |
| 2010/0015976 A1* | 1/2010 | Issa | G06F 21/6263 |
| | | | 455/435.1 |
| 2010/0144318 A1* | 6/2010 | Cable | H04L 67/1095 |
| | | | 455/412.1 |
| 2011/0212705 A1 | 9/2011 | Sprigg et al. | |
| 2012/0266107 A1 | 10/2012 | Bates et al. | |
| 2012/0282906 A1* | 11/2012 | Frye | H04W 4/40 |
| | | | 455/414.2 |
| 2013/0069893 A1* | 3/2013 | Brinda | G06F 3/0488 |
| | | | 345/173 |
| 2014/0011487 A1 | 1/2014 | Hwang et al. | |
| 2014/0219272 A1* | 8/2014 | Shuman | H04W 76/12 |
| | | | 370/352 |
| 2014/0273962 A1 | 9/2014 | Sankaranarayanan et al. | |
| 2015/0256570 A1 | 9/2015 | Joon et al. | |
| 2016/0054845 A1* | 2/2016 | Takahashi | G06F 3/0488 |
| | | | 345/173 |
| 2016/0057154 A1* | 2/2016 | Ferguson | H04L 63/08 |
| | | | 726/7 |
| 2016/0057586 A1* | 2/2016 | Lee | H04M 3/53383 |
| | | | 455/413 |
| 2016/0352671 A1* | 12/2016 | Vaccari | H04L 51/32 |
| 2016/0373576 A1 | 12/2016 | Sankaranarayanan et al. | |
| 2017/0006160 A1* | 1/2017 | Marya | H04M 3/436 |
| 2017/0070608 A1* | 3/2017 | Sugaya | H04M 3/42042 |
| 2017/0214789 A1* | 7/2017 | Jung | H04W 4/16 |
| 2018/0109673 A1 | 4/2018 | Sankaranarayanan et al. | |
| 2018/0309801 A1* | 10/2018 | Rathod | H04L 51/04 |

FOREIGN PATENT DOCUMENTS

| | | |
|---|---|---|
| KR | 1020140120118 | 10/2014 |
| KR | 101467248 | 12/2014 |
| WO | WO 2007098508 | 8/2007 |

OTHER PUBLICATIONS

PCT/ISA/210 Search Report issued on PCT/KR2017/001291 (pp. 3).
PCT/ISA/237 Written Opinion issued on PCT/KR2017/001291 (pp. 5).

* cited by examiner

ELECTRONIC DEVICE FOR SUPPORTING PROFILE CALL AND PROFILE CALL METHOD

PRIORITY

This application is a National Phase Entry of PCT International Application No. PCT/KR2017/001291 which was filed on Feb. 6, 2017, and claims priority to Korean Patent Application No. 10-2016-0014700, which was filed on Feb. 5, 2016, the content of each of which is incorporated herein by reference.

TECHNICAL FIELD

The present disclosure relates to technologies of sharing a profile image of a user upon call connection and managing profile images of users.

BACKGROUND ART

In general, when a user receives a telephone call, he or she may verify a number, a name, or the like of a calling party who originates the telephone call. For example, a telephone number of the calling party or a name of the calling party corresponding to the telephone number may be displayed on a display of a smartphone. A user (a called party) of the smartphone may receive the telephone call or may reject the reception of the telephone call, based on the displayed information of the calling party.

With the development of communication technologies and the distribution of a social networking service (SNS), users may easily register and share their profile pictures. For example, each of users may store a user's own image and images of users registered with his or her contacts in his or her user terminal. When a telephone call is received, an image corresponding to a telephone number of a calling party may be output on a display of the user terminal. Alternatively, a user may register (upload) his or her profile picture with an online account (e.g., a Samsung account, a Facebook account, a Twitter account, or the like) or may link the online account with contacts of his or her user terminal. When a session for a telephone call is received, a profile picture registered with the account may be output on a display of the user terminal.

DISCLOSURE

Technical Problem

In a method of managing profile pictures of users registered with contacts in a local (e.g., a user terminal), a user should separately register, change, and manage photos of a target in his or her contacts. In a method of managing profile pictures of users in a server (e.g., an online account), since profile images of users registered with the account are shared, it is difficult for a user to directly manage the profile images. For example, although a user changes a profile picture in the local, the profile picture registered with the account may still be shared.

As such, in case of the conventional method, due to careless management of a user, complexity of an information update method, or the like, a profile picture is not registered with contact information registered with a user terminal, or the profile picture is not almost updated or managed although the profile picture is registered.

Aspects of the present disclosure are to address at least the above-mentioned problems and/or disadvantages and to provide at least the advantages described below. Accordingly, an aspect of the present disclosure is to provide a method and apparatus for transmitting personal profile information including a profile picture of a user between a sender and a receiver based on a relationship, intimacy, or the like according to a contact group during a call (during attempting to make a call).

Accordingly, an aspect of the present disclosure is to provide a method and apparatus for sharing personal profile information expanded to other images (e.g., a background image such as a landscape), an emoticon, a state message, a favorites link, or the like other than a profile picture.

Accordingly, an aspect of the present disclosure is to provide a method and apparatus for transmitting a profile picture folder or a plurality of profile pictures corresponding to a contact group such that a receiver selects a preferred photo, rather than simply transmitting a profile picture (or a profile image) of a user.

Technical Solution

In accordance with an aspect of the present disclosure, an electronic device is provided. The electronic device may include a communication circuit configured to support a call function, a memory storing a database including contacts of a plurality of users, the database including a plurality of contact groups and the plurality of users including a first user who belongs to a first contact group among the plurality of contact groups, and a processor configured to, when receiving a user input for originating a call to the first user, cause the communication circuit to transmit, to a user terminal of the first user, a request for a profile call, including a contact of the first user and information about images corresponding to the first contact group.

Advantageous Effects

According to embodiments disclosed in the present disclosure, the electronic device may transmit personal profile information including a profile picture stored in a user terminal between a sender and a receiver depending on a contact group during a call. Further, the electronic device may increase user experience by transmitting a photo folder for each contact group such that a receiver selects a preferred photo.

In addition, various effects directly or indirectly ascertained through the present disclosure may be provided.

MODE FOR INVENTION

Figure 1:
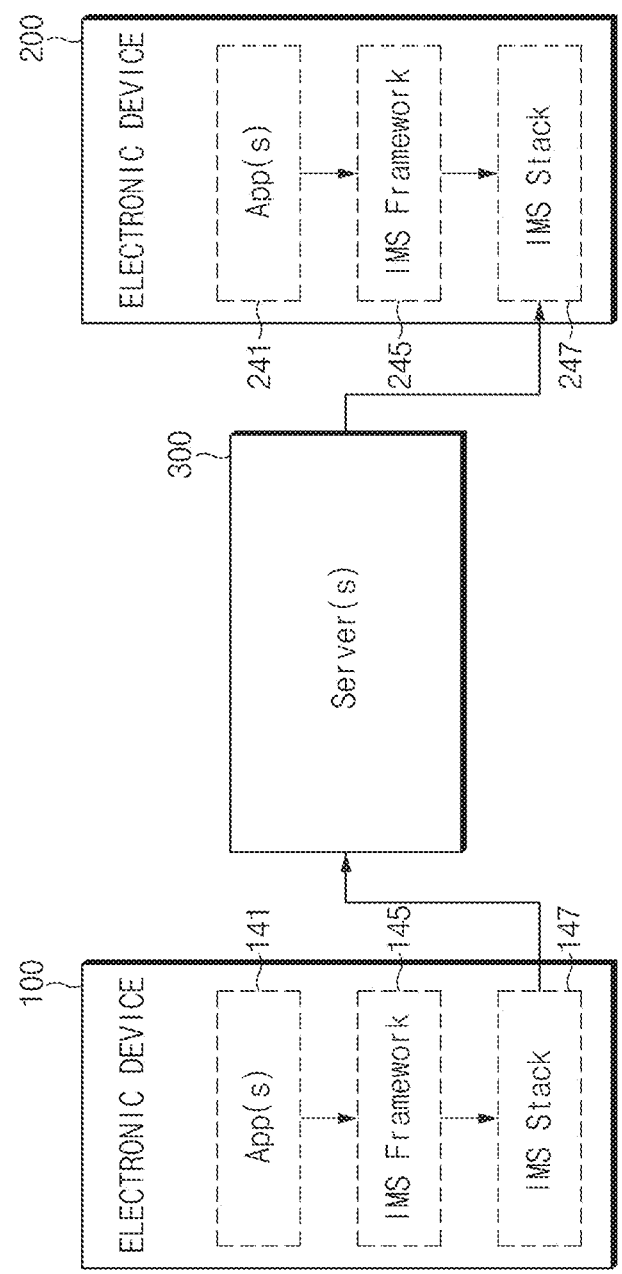
FIG. 1 is a drawing illustrating a communication network environment according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

Abbreviations in the present disclosure may be defined as follows:

AS—Application Server
CS—Circuit Switched
CSFB—Circuit Switched Fallback
HSS—Home subscriber server
IM—Instant Messaging
IMS—IP Multimedia Subsystem
JSON—JavaScript Object Notation
LTE—Long Term Evolution
PS—Packet Switched
RCS—Rich Communication Suite
SIP—Session Initiation Protocol
UE—user equipment
URI—Uniform Resource Identifier
VoLTE—Voice over LTE
XML—eXtensible Markup Language Hereinafter, an electronic device according to various embodiments will be described with reference to the accompanying drawings.

FIG. 1 is a drawing illustrating a communication network environment according to an embodiment.

Referring to FIG. 1, embodiments of the present disclosure may be implemented in a communication network environment including a first electronic device 100, a second electronic device 200, and at least one server 300. The first electronic device 100 and the second electronic device 200 may be homogeneous devices or heterogeneous devices which support the same or compatible wireless communication function. Hereinafter, a description will be given of a configuration and operation of an apparatus with respect to the first electronic device 100. The description is also applicable to the second electronic device 200. When it is unnecessary to separately describe configurations or operations of the first electronic device 100 and the second electronic device 200, the first electronic device 100 may be simply referred to as the electronic device 100. Further, the expression "user terminal" or "user equipment (UE)" in the present disclosure may correspond to any one of the electronic devices. The expression "user" may correspond to any one of a target, a sender, or a receiver. In an embodiment, for convenience of classification, a device of a calling party may be called the electronic device 100, and a device of a called party may be called the user terminal 200.

The server 300 may include one or more servers. For example, a home subscriber server (HSS), an application server (AS), or the like for supporting an internet protocol (IP) multimedia subsystem (IMS) environment or an IMS-based rich communication suite (RCS) environment may be included in the server 300. Further, in the present disclosure, it may be understood that the server 300 includes a base station for a communication service. Further, a $3^{rd}$ party server, such as a profile server which stores a profile image of a user or content uploaded by the user, may be included in the server 300. For convenience of description, unless particularly classified, the server 300 may be understood as the concept of being collectively called the above-mentioned servers.

In an embodiment, the first electronic device 100 may be a device which supports a specific communication network. Further, the first electronic device 100 may communicate with the second electronic device 200 under a protocol defined in the specific communication network. Particularly, the first electronic device 100 may transmit a call request based on the protocol to the second electronic device 200 (via the server 300). Profile information of the user, which will be described later, may be included in the call request.

For example, the first electronic device 100 may be a device (an IMS enabled device) for supporting an IMS. The first electronic device 100 may correspond to a user terminal communicable under a session initiation protocol (SIP) in an IMS environment. Further, a telephone call performed between the first electronic device 100 and the second electronic device 200 via the server 300 may correspond to a voice/video call using a packet switched (PS) network such as voice over long term evolution (VoLTE). In this case, the first electronic device 100 may transmit a request for a profile call according to an embodiment disclosed in the present disclosure to the second electronic device 200 based on an SIP.

In this example, when a called party and profile information to be transmitted are specified in an application 141 such as a contact application, the first electronic device 100 may provide the specified information to an IMS stack 147 through an IMS framework 145. The IMS stack 147 may generate an SIP message based on the provided information and may transmit the generated SIP message to the server 300 (e.g., an IMS core). When the second electronic device 200 receives an SIP message originated from the first electronic device 100 from the server 300, the IMS stack 247 may obtain profile image information of the called party from the SIP message and may deliver the obtained information to the IMS framework 245. The IMS framework 245 may deliver the provided information to an application 241. The application 241 may output a profile image of the called party based on identification information (e.g., a telephone number) of the called party, a name of the called party, and the information on a display of the second electronic device 200.

Figure 2:
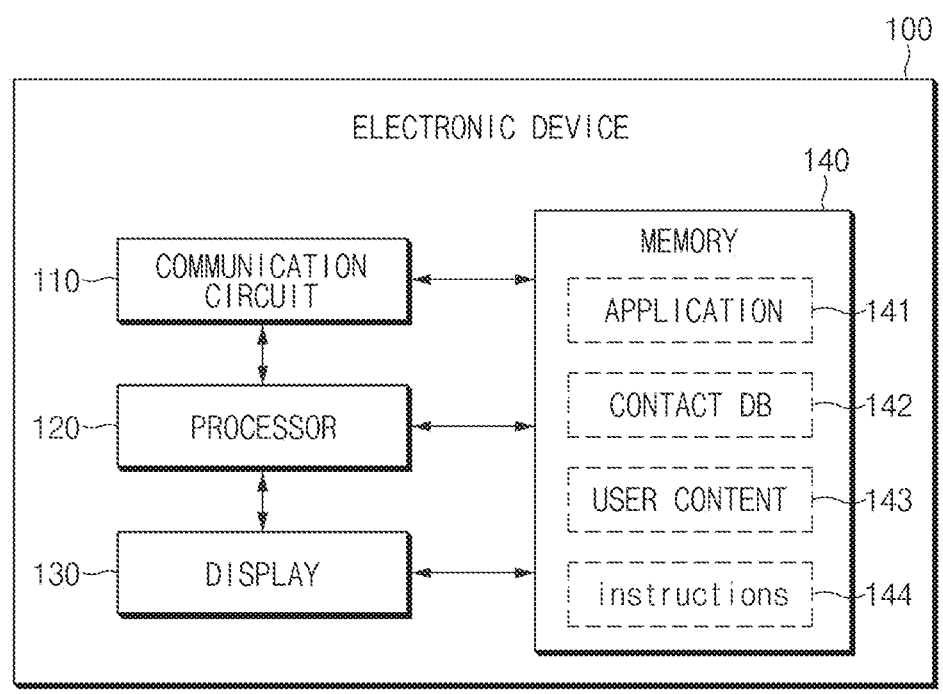
FIG. 2 is a block diagram illustrating an exemplary configuration of an electronic device according to an embodiment.

FIG. 2 is a block diagram illustrating an exemplary configuration of an electronic device according to an embodiment.

An electronic device 100 may include a communication circuit 110, a processor 120, a display 130, and a memory 140. The above components may transmit and receive data and a control signal through a bus. Further, the flow of data or a control signal, displayed by an arrow in FIG. 2, is an example, and other embodiments are possible. For example, the communication circuit 110 may directly control some of functions of the display 130. Further, additional components other than the components shown may be included in the electronic device 100. For example, a camera, a battery, an illumination sensor, a fingerprint sensor, or the like may be included in the electronic device 100.

The communication circuit 110 may support a wireless network. Particularly, the communication circuit 110 may support a cellular network. For example, the communication circuit 110 may support a second generation (2G)/third generation (3G) communication network, a fourth generation (4G) communication network (e.g., long term evolution (LTE), LTE-advanced, or the like), and a subsequent generation communication network. Further, the communication circuit 110 may support a PS network and may also support a CS network. Further, the communication circuit 110 may support an IMS and an RCS which operates based on the IMS.

The processor 120 may include one or more of a central processing unit (CPU), an application processor (AP), or a communication processor (CP). The processor 120 may drive an operating system or an application 141 to control a plurality of hardware or software components connected to the processor 120 and may process and compute various data. The processor 120 may be implemented as, for example, a system on chip (SoC). According to an embodiment, the processor 120 may further include a graphic processing unit (GPU) and/or an image signal processor. Further, in an embodiment, the processor 120 may be understood as the concept of including the communication circuit 110.

The processor 120 may output a screen where the application 141 is executed, on the display 130. For example, the processor 120 may output a contact list, a calling screen, a called screen, or the like on the display 130.

For example, when a contact application is executed, the processor 120 may refer to a contact database (DB) 142 stored in the memory 140. The contact DB 142 may include a plurality of contact groups, and each of the plurality of contact groups may include one or more contacts. A description will be given of an exemplary structure and relationship of the contact DB 142 the processor 120 may refer to, with reference to FIG. 3.

The processor 120 may generate, edit, manage and delete user content 143 stored in the memory 130 and may transmit the user content 143 to the outside. The user content 143 may be an image such as a profile picture of a user. Further, in various embodiments, the user content 143 may include various data such as an image, a video, a text, an emoticon, and a link.

The processor 120 may include instructions 144 for implementing a software module or executing a specific function. For example, the processor 120 may execute the instructions 144 to implement an IMS framework 145 or an IMS stack 147. Further, the processor 120 may construct an environment, such as an operations system (OS), a kernel, or middleware, necessary to drive the electronic device 100 based on the instructions 144 and may activate hardware components.

Figure 3:
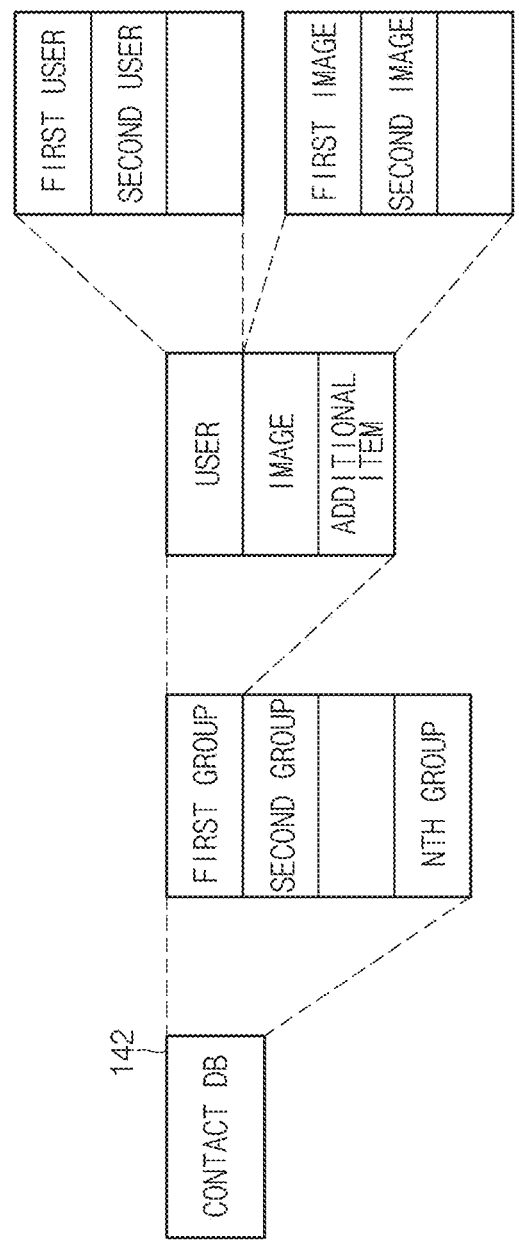
FIG. 3 is a drawing illustrating a structure of a contact database according to an embodiment.

FIG. 3 is a drawing illustrating a structure of a contact database according to an embodiment.

A contact DB 142 may include a plurality of contact groups. For example, a first group may be set to "family", a second group may be set to "friends", and a third group may be set to "colleagues". The contact DB 142 may include N contact groups. In an embodiment, contacts which are not classified into groups which are previously defined or are generated by a user may be defined as one group (e.g., an unclassified group).

Each group may have a plurality of subitems. For example, the first group may include "user", "image", and the other additional items. In other words, the first group may be associated with a plurality of users (e.g., a first user, a second user, a third user, and the like) included in the first group and a plurality of images (e.g., a first image, a second image, a third image, and the like) corresponding to the first group. The additional item may correspond to personal user information. For example, a user of an electronic device 100 may register personal information, suitable for contacts (e.g., the first user, the second user, and the third user) which belong to the first group, with an additional item of the first group. For example, when the first group is set to "colleagues", a position, an extension, a fax number, an office e-mail address, an office homepage link, or the like of the user of the electronic device 100 may be registered with the additional item.

A plurality of images corresponding to each group may be stored in a memory 140 of the electronic device 100 by the user. In an embodiment, the user may upload images to a 3$^{rd}$ party server, such as a profile server, using a communication circuit 110. In this case, image information corresponding to each contact group may be a link (e.g., a uniform resource identifier (URI)) of an uploaded image. In other words, each contact group may correspond to a plurality of images, and a link of a corresponding image file or a corresponding image may be stored in the memory 140.

In an embodiment, the electronic device 100 may transmit a request for a profile call, including image information stored in the electronic device 100 (e.g., the image file itself or a link of an image file), to a target (e.g., a user terminal 200). The user terminal 200 may output a profile image of a user of the electronic device 100 on a display of the user terminal 200 based on the image information included in the request for the profile call. Hereinafter, a description will be given of an exemplary request for a profile call with reference to Table 1. The request for the profile call may be implemented as a structured document such as an extensible markup language (XML) or a JavaScript object notation (JSOM). Further, the request for the profile call may correspond to an SIP INVITE message according to an embodiment.

TABLE 1

```
<?xml version="1.0" encoding="UTF-8"?>
<user-profiles xmlns="urn:oma:xml:xdm:user-profile">
  <user-profile uri="sip:rcsuser1@example.com">
    <communication-addresses>
        <comm-addr>+1 858 623 0743</comm-addr>
        <comm-addr>asmith@omaorg.org</comm-addr>
        <comm-addr>sip:rcsuser1@example.com</comm-addr>
    </communication-addresses>
    <display-name xml:lang="en">Alice</display-name>
    <birth-date>1995-05-20</birth-date>
    <name xml:lang="en">
        <given-name>Alice</given-name>
        <family-name>Smith</family-name>
        <middle-name>Pamela</middle-name>
        <name-suffix>Mr.</name-suffix>
    </name>
    <address xml:lang="en">
        <country>Korea</country>
        <region>Gyeonggido</region>
```

TABLE 1-continued

```
        <locality>Suwon-si</locality>
        <area>Yongtong-gu</area>
        <street-name>Bongyoungro</street-name>
        <street-number>1526</street-number>
        <postal-code>16701</postal-code>
    </address>
    <gender>male</gender>
    <freetext xml:lang="en">I'm an Oh </freetext>
    <profile-picture>
        <link>http://www.example.com/alice/myself.jpg</link>
    </profile-picture>
    <profilecall-pictures>
        <profilecall-picture-entry contact-type="family">
    <link>http://www.example.com/alice/myfamily1.jpg</link>
    <link>http://www.example.com/alice/myfamily2.jpg</link>
    <link>http://www.example.com/alice/myfamily3.jpg</link>
        </profilecall-picture-entry>
        <profilecall-picture-entry contact-type="friends">
    <link>http://www.example.com/alice/myfriends1.jpg</link>
    <link>http://www.example.com/alice/myfriends2.jpg</link>
    <link>http://www.example.com/alice/myfriends3.jpg</link>
        </profilecall-picture-entry>
        <profilecall-picture-entry contact-type="colleagues">
    <link>http://www.example.com/alice/mycolleagues1.jpg</link>
    <link>http://www.example.com/alice/mycolleagues2.jpg</link>
    <link>http://www.example.com/alice/mycolleagues3.jpg</link>
        </profilecall-picture-entry>
    <profilecall-pictures>
    <communication-types>
        <comm-type xml:lang="en">Push to talk</comm-type>
        <comm-type xml:lang="en">Instant messaging</comm-type>
    </communication-types>
    <hobbies>
        <hobby xml:lang="en">Butterfly collecting</hobby>
        <hobby xml:lang="en">Bird watching</hobby>
    </hobbies>
    <favourite-links>
        <link>http://www.openmobilealliance.org/</link>
        <link>http://ietf.org</link>
    </favourite-links>
  </user-profile>
</user-profiles>
```

Hereinafter, a description will be given of a markup language used in Table 1. <communication-addresses> may indicate contacts of the user of the electronic device 100. <communication-addresses> may include various sub-elements such as a telephone number (e.g., +1 868 623 0742), an e-mail address, and an SIP URI of the user.

<display-name> may indicate a name of a user to be displayed on a display 130 of the electronic device 100. <birth-date> may indicate a birthday of the user. <name> may include a sub-element such as a family name, a first name, a middle name, or a title of the user. <address> may indicate an item associated with an address (e.g., a country, a city, a zip code, or the like) of the user. <gender> may indicate a gender of the user. <freetext> may indicate a free text set (input) by the user. <profile-picture> may correspond to a default profile image of the user of the electronic device 100 or an image of the user to be displayed on a partial region of the display 130 of the electronic device 100 upon call origination. An image of <profile-picture> may be specified as <link>. <link> may indicate, for example, a URI of an external server (e.g., a 3$^{rd}$ party server) or may indicate a relative path or an absolute path of a file stored in the memory 140 of the electronic device 100.

<profilecall-pictures> may indicate image information to be transmitted to a target, in a request for a profile call according to an embodiment. <profilecall-pictures> may have a contact type (e.g., a contact-type) as an attribute value. Herein, the contact type may correspond to the above-mentioned contact group. For example, the electronic device 100 may transmit a request for a profile call to the user terminal 200. When a user (i.e., a called party) of the user terminal 200 is a "first user" and when a contact group to which the first user belongs is "family" in a contact DB 142 of the electronic device 100, information about images (e.g., myfamily1.jpg, myfamily2.jpg, and myfamily3.jpg) defined as a sub-element of <profilecall-picture-entry contact-type="family"> among images defined by <profilecall-pictures> may be transmitted to the user terminal 200. In an example of Table 1, a URI (e.g., a web address) for each image may be used as image information.

In the embodiment of Table 1, image information of all contact groups (e.g., "family", "friends", and "colleagues") may be included in an XML document of a request for a profile call. However, in another embodiment, a processor 120 may generate an XML document which includes only information of images corresponding to a contact group (e.g., "family") the called party (e.g., the "first user") belongs as a sub-element of <profilecall-pictures>.

In addition, various personal user information items may be included in the request for the profile call. For example, <communication-types> may indicate a contact means the user prefers. A "push to talk" service or an "instant messaging (IM)" service the user prefers may be defined as a preferred contact means. Further, items indicating a hobby (e.g., <hobbies>) or favorites (e.g., <favourite-links>) of the user may be included in the request for the profile call.

The XML document of Table 1 may be an example, and a document format complying with a different standard may be used for the XML document. Further, titles or grammars of tags described in Table 1 may be freely changed within the level of those skilled in the art. This may correspond to an example of another structured document or tag described in the present disclosure.

Figure 4:
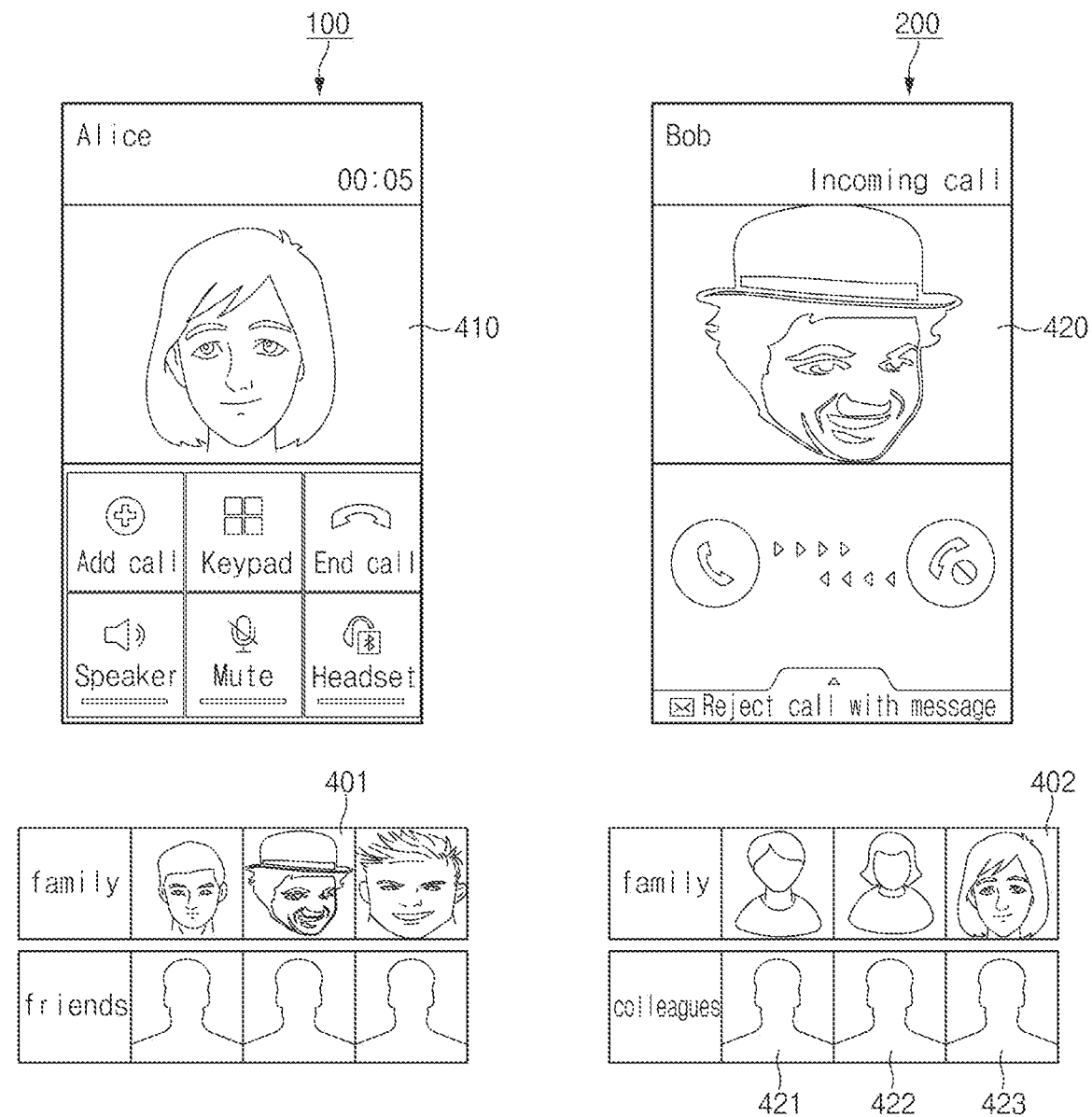
FIG. 4 is a drawing illustrating an image displayed on a display upon profile call connection according to an embodiment.

FIG. 4 is a drawing illustrating an image displayed on a display upon a profile call according to an embodiment.

FIG. 4 illustrates a profile image displayed on each terminal, in a situation where Alice makes a profile call to Bob. For convenience of description, it is assumed that a terminal (i.e., an originating terminal) of Alice is an electronic device 100, that a terminal (i.e., a receiving terminal) of Bob is a user terminal 200, that Alice and Bob have a family relationship, and that contacts of each of Alice and Bob are registered with a "family" group. Further, it is assumed that both the electronic device 100 and the user terminal 200 support an RCS.

The electronic device 100 may transmit a request for a profile call to the user terminal 200. In detail, the electronic device 100 may verify that the called party "Bob" belongs to the "family" group among contact groups and may transmit a request for a profile call, including information about a plurality of images corresponding to the "family" group to the user terminal through a server 300. Any image 401 among the plurality of images corresponding to the "family" group may be previously selected by a user or the electronic device 100 or may be specified at a time when the request for the profile call is transmitted. In an embodiment, information indicating that the image 401 is selected may be included in the request for the profile call. The user terminal 200 may output the image 401 on a profile image region 420 based on the provided image information. In another embodiment, the user terminal 200 may provide (e.g., display) all the provided image information to a receiver (i.e., Bob) and may output the information on the image profile image region 420 selected in response to selection of the receiver. Alternatively, the user terminal 200 may select any image based on the provided image information and may output the selected image on the profile image region 420.

In this case, an image different from the image 401 may be displayed according to the selection of the receiver.

The user terminal 200 may determine whether the sender (i.e., Alice) corresponds to any of contact groups in a contact DB stored in the user terminal 200 to which the sender (i.e., Alice) belongs. In the example of FIG. 4, it is assumed that Alice is registered with a "family" contact group of Bob. The user terminal 200 may transmit information about images corresponding to the "family" contact group to the electronic device 100. In this case, the user terminal 200 may provide the information to the electronic device 100 through the server 300 and may provide the information to the electronic device 100 through a $3^{rd}$ party server which stores the images. Likewise, the electronic device 100 may output an image 402 selected by a user of the user terminal 200 or an image randomly selected by the sender or the electronic device 100 on a profile image region 410 based on the image information provided from the user terminal 200. A description associated with this will be given later with reference to FIG. 5 and the like.

When Alice is included in another group, for example, a "colleagues" contact group in contacts of Bob, the user terminal 200 may transmit information about images 421, 422, 423, and the like corresponding to the "colleagues" contact group to the electronic device 100. In this case, an image different from the image 402, for example, any one of the images 421-423 may be output on the profile image region 410.

Figure 5:
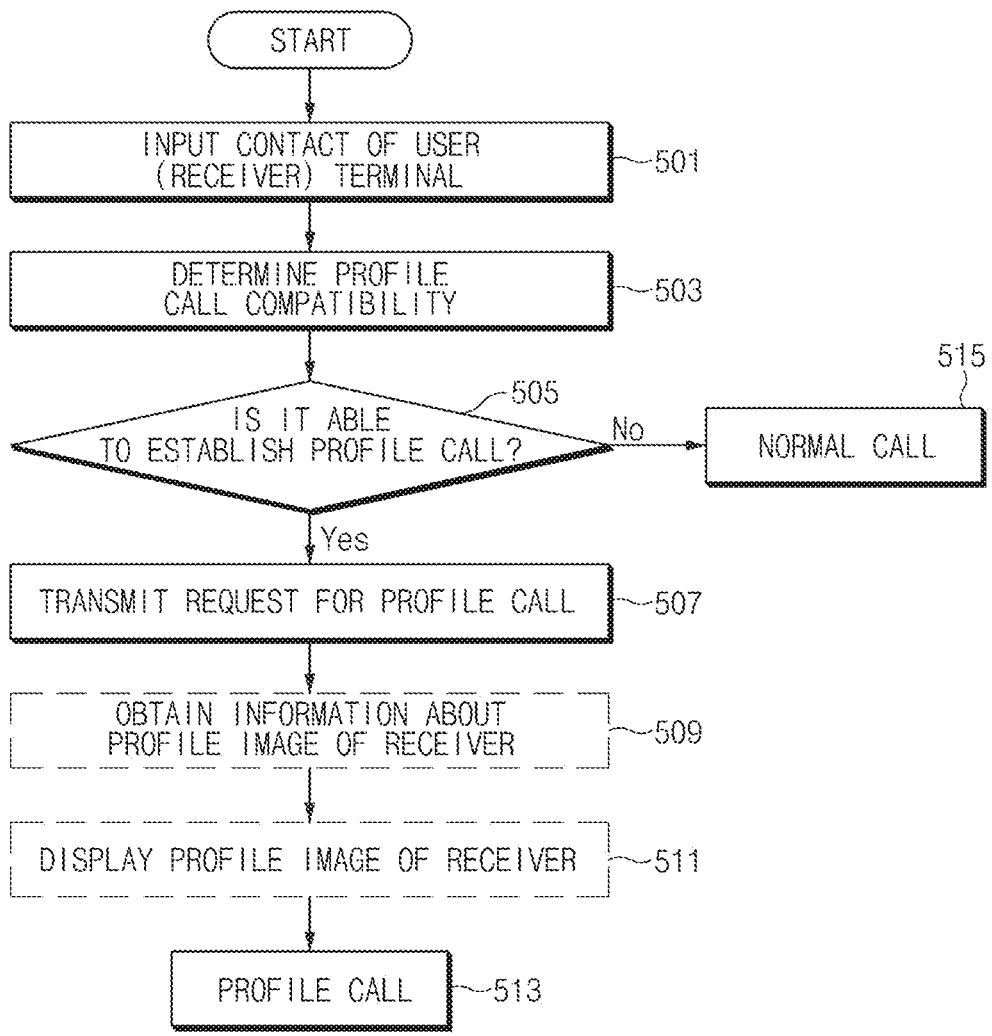
FIG. 5 is a flowchart illustrating a profile call request process of a transmitting electronic device according to an embodiment.

FIG. 5 is a flowchart illustrating a profile call request process of a transmitting electronic device according to an embodiment. A process of each of FIGS. 5 and 6 may correspond to a situation where an electronic device 100 makes a call to a user terminal 200. Thus, an originating electronic device may be understood as the electronic device 100.

Referring to FIG. 5, in operation 501, the electronic device 100 may receive a contact of the user terminal 200 (i.e., a telephone number of a receiver) from a user of the electronic device 100. For example, the electronic device 100 may receive the telephone number of the receiver from the user through an input interface, such as a physical keyboard or a physical keypad, or a software keyboard/keypad output on a display 130 of the electronic device 100.

In operation 505, the electronic device 100 may determine whether it is able to establish a profile call according to an embodiment between the electronic device 100 and the user terminal 200. For example, the electronic device 100 may determine whether the user terminal 200 is a terminal which supports an RCS or whether it is able to output a profile image on a display of the user terminal 200 based on a request for a profile call, transmitted by the electronic device 100. For example, the electronic device 100 may transmit, to a server 300, an SIP OPTIONS request for verifying whether the user terminal 200 supports a profile call. The electronic device 100 may determine whether the user terminal 200 supports a profile call based on a response received from the server 300. In this regard, a description will be given in detail with reference to FIG. 10.

When it is determined that it is able to establish the profile call in operation 505, in operation 507, the electronic device 100 may transmit a request for a profile call to the user terminal 200 through the server 300. For example, when a user input on an originating button or an originating menu occurs, the electronic device 100 may transmit the request for the profile call or a normal voice call depending on the determined result. For example, when it is determined that it is not able to establish the profile call in operation 505, that is, when the user terminal 200 does not support a voice call using a PS network such as VoLTE or when the user terminal 200 does not have a software/hardware module capable of processing the request for the profile call according to an embodiment although it supports the voice call, in operation 515, the electronic device 100 may transmit a normal call using a conventional scheme (e.g., circuit switched fallback (CSFB) or the like).

When receiving request for the profile call, the user terminal 200 may output at least one image on the display of the user terminal 200 based on image information included in request for the profile call. Further, the user terminal 200 may transmit, to the electronic device 100, information about images corresponding to a contact group with which the user of the electronic device 100 is registered. In this regard, a description will be given with reference to FIG. 6.

In operation 509, the electronic device 100 may obtain profile image information of a receiver (i.e., the user of the user terminal 200) from the user terminal 200. The profile image information may be transmitted through a $3^{rd}$ party server or may be transmitted to the electronic device 100 through a mobile network operator (MNO) server.

In operation 511, the electronic device 100 may output the profile image of the receiver on the display 130 of the electronic device 100 based on the obtained image information. Through operations such as the process of FIG. 5, as shown in FIG. 4, one of images of a contact group which is preset by a user of each of an originating terminal and a receiving terminal may be output on both the originating terminal and the receiving terminal.

Figure 6:
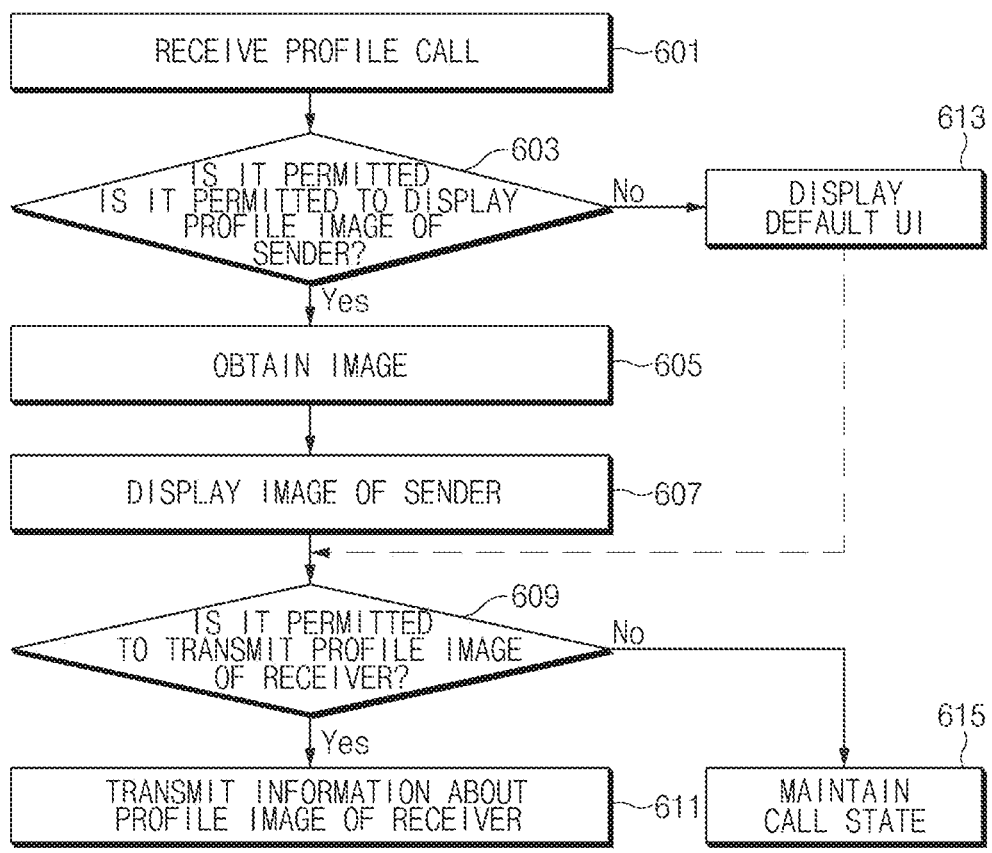
FIG. 6 is a flowchart illustrating a process of processing a request for a profile call at a receiving electronic device according to an embodiment.

FIG. 6 is a flowchart illustrating a process of processing a request for a profile call at a receiving electronic device according to an embodiment. Herein, the receiving electronic device may be understood as a user terminal 200.

Referring to FIG. 6, in operation 601, the user terminal 200 may receive a profile call. The profile call received in operation 601 may correspond to a request for a profile call, transmitted by an electronic device 100 in operation 507 of FIG. 5. Further, a state where the profile call is received may correspond to a state (e.g., a ringing state) where the user terminal 200 provides a notification that the request for the profile call is received, rather than a state where a receiver provides an input corresponding to call acceptance to the user terminal 200.

In operation 603, the user terminal 200 may determine whether it is permitted to display a profile image of a sender. For example, in an application or system settings of the user terminal 200, when a request for a profile call is received, a control circuit (e.g., a processor) of the user terminal 200 may verify settings of displaying a profile image of a target (a calling party). A description will be given of settings associated with a profile call with reference to FIG. 7.

When it is not permitted to display the profile image based on the request for the profile call, in operation 613, the user terminal 200 may display a default call user interface (UI) or may display an image of a sender predefined (previously registered) by a receiver.

When it is permitted to display the profile image based on the request for the profile call, in operation 605, the user terminal 200 may obtain a profile image(s) based on image information included in the request for the profile call. For example, when a URI for profile images is included in the request for the profile call, the user terminal 200 may access the URI to obtain the images. When a specific image is previously designated as a profile image to be displayed or is randomly selected by the user terminal 200, the user terminal 200 may access only a URI for the specific image to obtain the image.

In operation 607, the user terminal 200 may display any one of the obtained images as a profile image of the sender. When the plurality of images are obtained, an image selected by the user terminal 200 or a user (receiver) of the user terminal 200 may be displayed as a profile image.

In operation 609, the user terminal 200 may determine whether it is permitted to transmit a profile image of the receiver to the electronic device 100. Likewise, when a request for a profile call is received, the user terminal 200 may verify settings of transmitting a profile image of the receiver to a terminal of the sender. When it is permitted to transmit the profile image of the receiver, in operation 611, the user terminal 200 may transmit information about the profile image of the receiver to the electronic device 100. In detail, the user terminal 200 may transmit information about images corresponding to a contact group which includes the sender in a contact DB through a $3^{rd}$ party server such as a profile server, or may generate an SIP message including the information and may transmit the generated SIP message through an MNO server (a server which transmits a request for a profile call). The electronic device 100 may output, for example, the profile image of the receiver on a display 130 based on image information obtained in operation 509.

Figure 7:
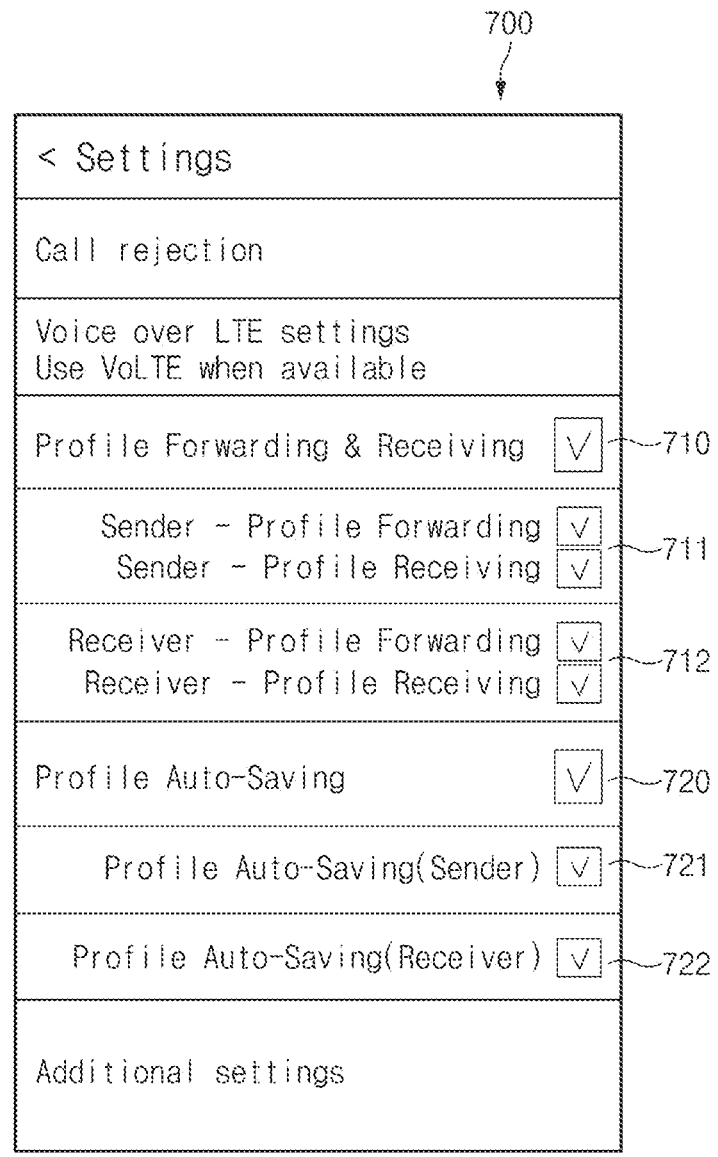
FIG. 7 is a drawing illustrating a setting screen associated with a profile call according to an embodiment.

FIG. 7 is a drawing illustrating a setting screen associated with a profile call according to an embodiment.

Referring to FIG. 7, an electronic device 100 may provide setting items shown in FIG. 7 in system settings or application settings associated with a telephone call. A setting screen 700 of FIG. 7 may be an example, and a design, a detailed item, a detailed setting method, or the like may be changed in a suitable manner within the level of those skilled in the art.

A profile forwarding/receiving item 710 may indicate an item capable of setting whether to use a function of forwarding and receiving profile images according to an embodiment. For example, when the item 710 is checked, both of a profile forwarding/receiving function upon origination and a profile forwarding/receiving function upon reception may be activated. In contrast, when the item 710 is unchecked, both the profile forwarding/receiving function upon origination and the profile forwarding/receiving function upon reception may be inactivated.

The profile forwarding/receiving item 710 may include a profile forwarding/receiving item 711 upon origination and a profile forwarding/receiving item 712 upon reception, as subitems. Each of the item 711 and the item 712 may include an item of setting profile forwarding and an item of setting profile receiving in detail. In detail, a "Sender—Profile Forwarding" item may correspond to an item capable of setting forwarding a sender's profile to a receiver upon origination of a profile call. A "Sender—Profile Receiving" item may correspond to an item capable of setting receiving a profile of the receiver on a sender's origination screen upon origination of a profile call. A "Receiver—Profile Forwarding" item may correspond to an item capable of setting forwarding a receiver's profile to a sender upon reception of a profile call. A "Receiver—Profile Receiving" item may correspond to an item capable of setting receiving a profile of the sender on a receiver's reception screen.

For example, in the embodiment of FIG. 6, when the "Receiver—Profile Forwarding" item in the item 712 is unchecked in a user terminal 200 (i.e., a receiving terminal), in operation 609, the user terminal 200 may determine that it is not permitted to forward a profile image to an electronic device 100.

The profile auto-saving item 720 may indicate an item capable of setting whether to use a function of automatically saving profile images obtained according to an embodiment. For example, when the item 720 is checked, it is able to map the obtained profile image to a user of a contact DB or it is able to store the obtained profile image in a gallery (or memory).

For example, a "Profile Auto-Saving (Sender)" item 721 may correspond to an item of setting automatically saving a profile of a receiver in sender's contacts after a profile call. A "Profile Auto-Saving (Receiver)" item 722 may correspond to an item of setting automatically saving a profile of a sender in receiver's contacts after a profile call in view of a receiver. In an embodiment, the electronic device 100 may continue updating profiles of contacts through profile auto-saving when making a call with a called party or may update profiles of contacts only when newly received profile information differs from profile information of an old contact. Further, as described above, as the item 720 is checked or unchecked, both the item 721 and the item 722 which are subitems are checked or unchecked.

There may be additional setting items other than the setting items described with reference to FIG. 7. For example, a user may set to use a profile call function in only some of a plurality of contact groups. For example, when originating a call to a called party which belongs to a group set to use the profile call function, a request for a profile call according to an embodiment may be transmitted. When originating a call to a called party which belongs to a group to which the profile call function is not applied, a request for a conventional normal call may be transmitted.

Figure 8:
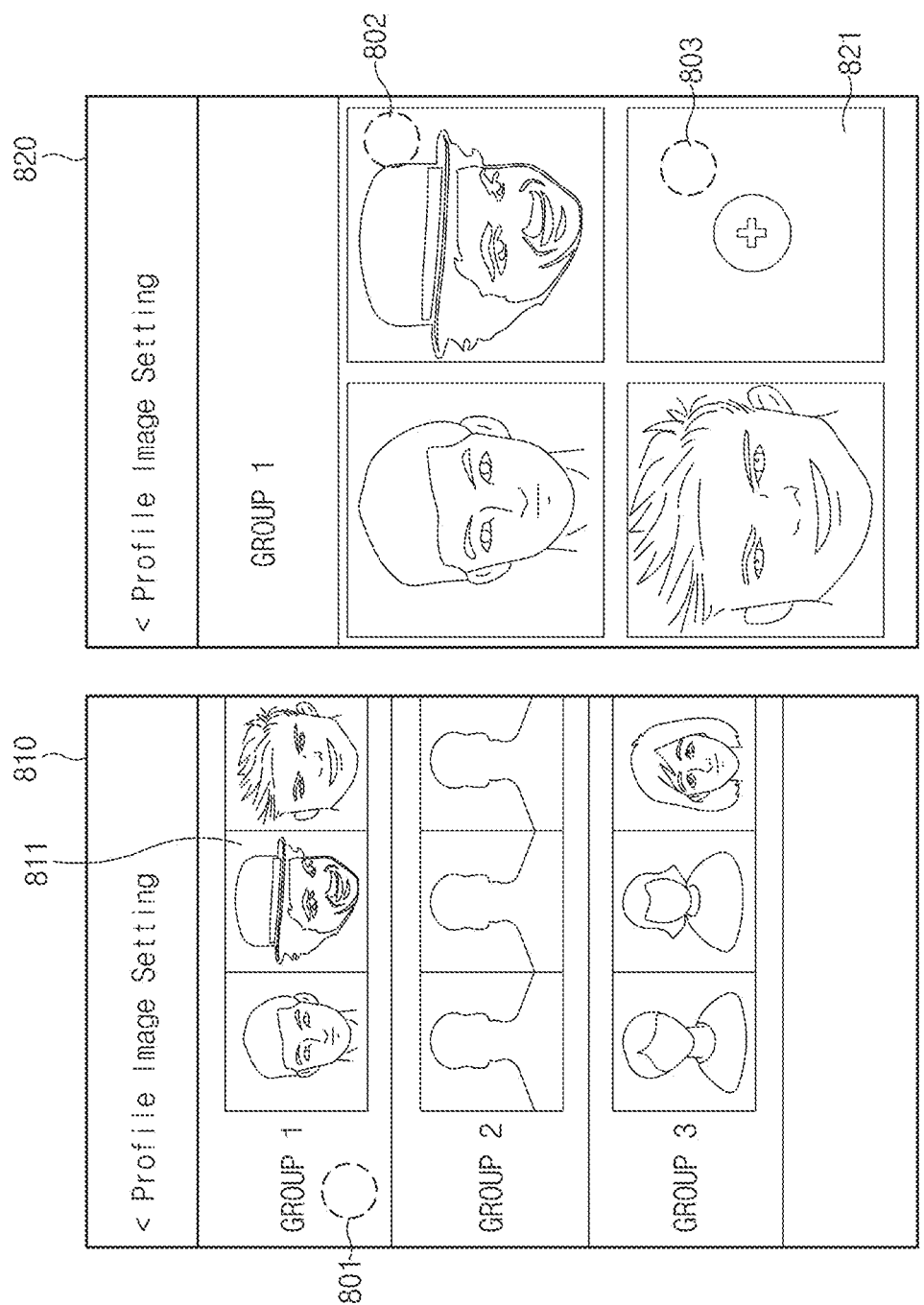
FIG. 8 is a drawing illustrating a screen for setting a profile image for a contact group according to an embodiment.

FIG. 8 is a drawing illustrating a screen for setting a profile image for a contact group according to an embodiment.

Referring to FIG. 8, an electronic device 100 may provide a UI capable of setting a profile image for each contact group. Such a UI may be provided on a setup screen of a contact application or a system setup screen.

For example, like a screen 810, a preview of images registered for each contact group may be displayed. Further, an image 811 which is designated as a representative image or is previously selected among registered images may be displayed with an effect different from other images (e.g., whether there is a periphery, color/black, a change in luminance, or the like). However, in another embodiment, a name of a group, the number of contacts included in the group, or the like may be displayed for each contact group, and a menu or icon capable of managing an image for a contact group may be separately displayed.

When a selection input 801 to a specific contact group (e.g., GROUP 1) occurs on the screen 810, the electronic device 100 may display a screen 820 which is a detailed setup screen. The electronic device 100 may output images previously registered for the selected group. When a selection input 802 to one of the previously registered images occurs, the electronic device 100 may set the selected image to a representative image of the group. The image set to the representative image may be output as a profile image on a display of a called party's terminal when a profile call is transmitted. However, in an embodiment, whether to output the image may be changed depending on settings of a called party's terminal (e.g., settings whether to use a function described with reference to FIG. 7) or selection on a pop-up screen provided when a profile call is received. A description will be given of the pop-up screen with reference to FIG. 9.

In an embodiment, when an add menu 821 for a contact group is selected, an image which is stored in the electronic device 100 or is provided by a content provider or the like may be added to an image corresponding to the contact group. An image registered through a specified input (e.g., a long touch or a drag in a specific direction) for a previously registered image may be removed.

Figure 9:
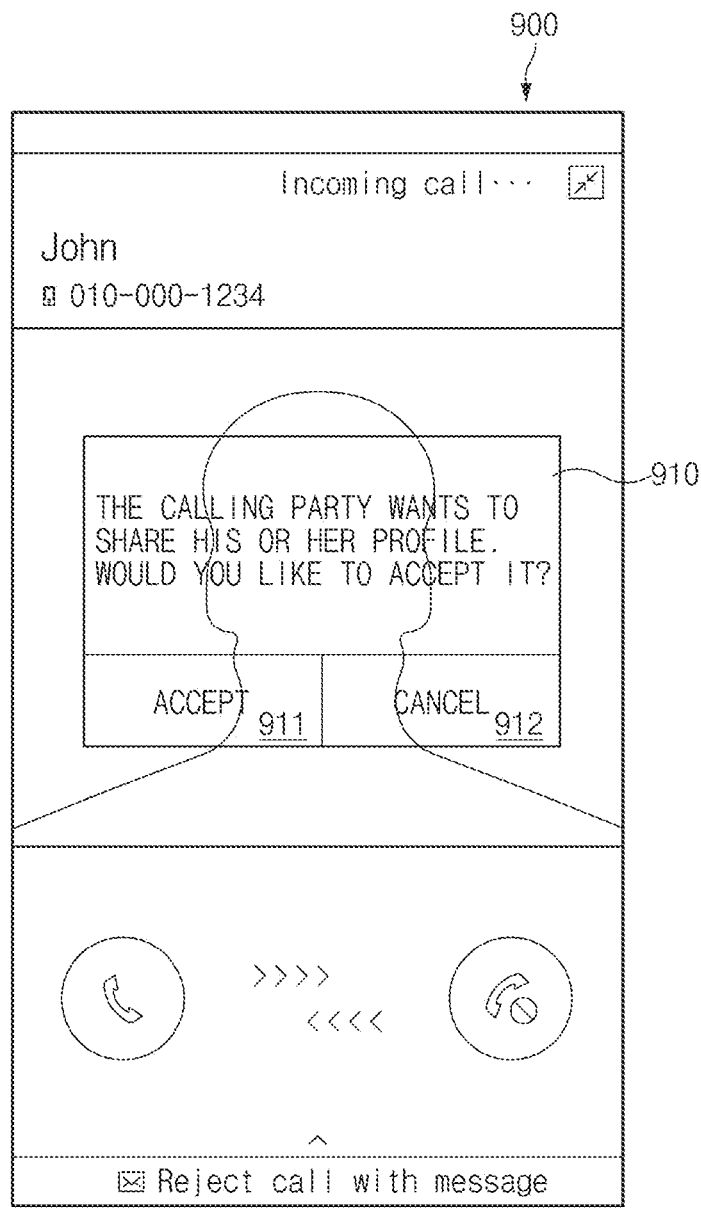
FIG. 9 is a drawing illustrating a pop-up screen for profile sharing upon profile call connection according to an embodiment.

FIG. 9 is a drawing illustrating a pop-up screen for profile sharing upon profile call connection according to an embodiment.

In an embodiment, when a sender attempts to make a profile call over an electronic device 100, a pop-up 910 about whether to accept profile forwarding may be displayed like a screen 900 on a display of a user terminal 200 of a receiver. For example, when receiving a profile call in a state where a "Receiver—Profile Receiving" item is not checked, the user terminal 200 may output the pop-up 910 for verifying whether to receive a profile of the sender and may receive the profile of the sender depending on a user input to the pop-up 910 (of course, as shown in FIG. 7, the user terminal 200 may reject reception of a profile image without outputting the pop-up 910). For example, when the receiver of the user terminal 200 selects a "confirm" 911, the user terminal 200 may receive the profile of the sender. When the receiver of the user terminal 200 selects a "cancel" 912, the user terminal 200 may fail to receive the profile of the sender. In this case, when a profile picture of the sender is stored in the user terminal 200, the profile picture may be displayed on the display of the user terminal 200.

Figure 10:
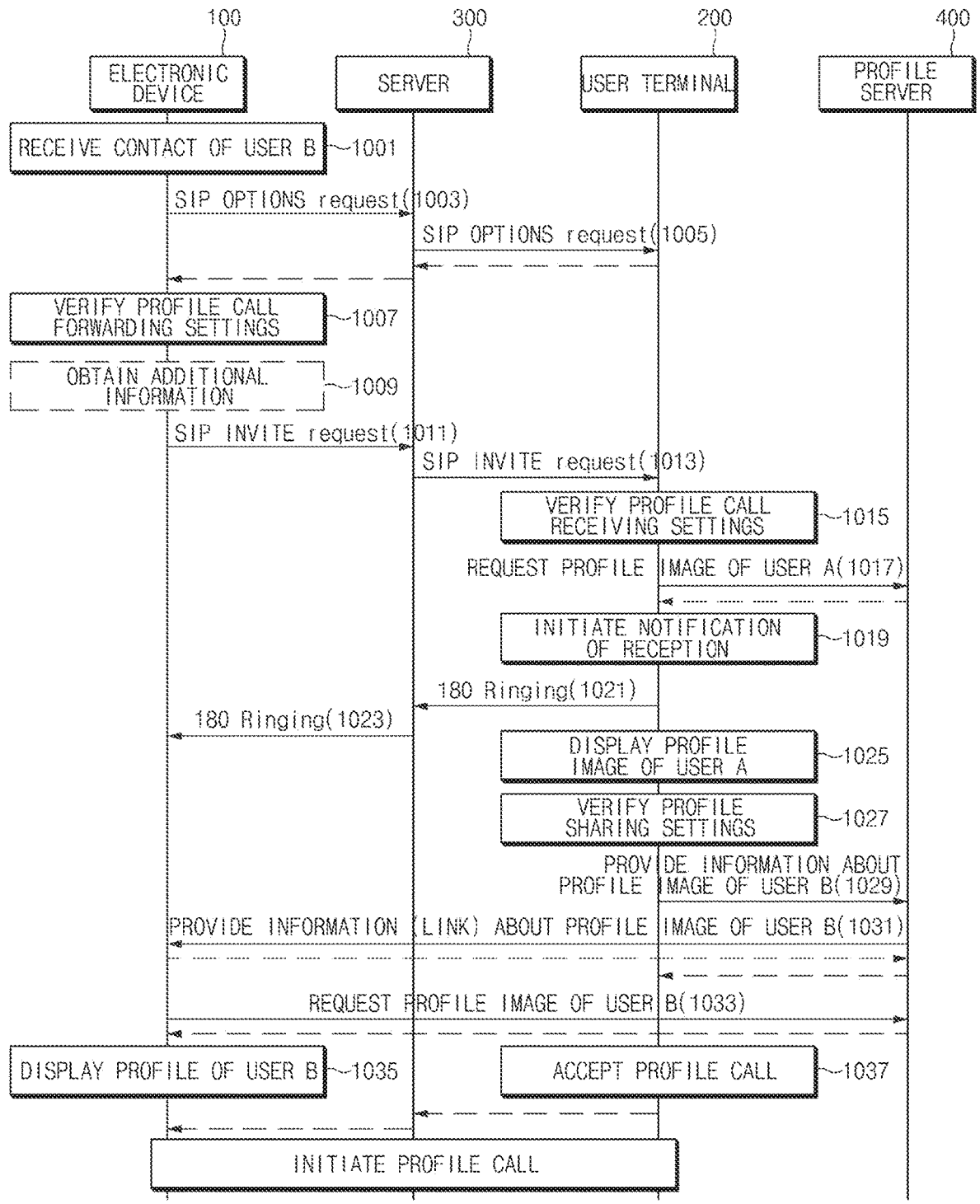
FIG. 10 is a signal sequence diagram illustrating a process of delivering a profile image using a $3^{rd}$ party server according to an embodiment.

FIG. 10 is a signal sequence diagram illustrating a process of delivering a profile image using a $3^{rd}$ party server according to an embodiment. The process shown in FIG. 10 may be understood as a series of operations in which user A makes a profile call according to an embodiment with User B. For convenience of description, it is assumed that user A corresponds to a user of an electronic device 100 as a sender of the profile call and that user B corresponds to a user of a user terminal 200 as a receiver of the profile call. A server 300 may be implemented with one or more servers (e.g., a first server, a second server, and the like) and may be understood as a cellular network system which provides a call service. For example, the server 300 may be understood as an IMS or an IMS-based RCS network environment. Further, a profile server 400 may correspond to an independent $3^{rd}$ party server unassociated with the call service. The profile server 400 may store profile images uploaded from the electronic device 100 or the user terminal 200. Further, the profile server 400 may provide a web address (e.g., a URI) capable of accessing images stored in the profile server 400 and downloading the images.

According to an embodiment, in operation 1001, the electronic device 100 may receive an input of a contact of user B. For example, the contact of user B may be entered in a dial pad, or user B may be selected from contacts. When user B is previously determined as a user capable of making a profile call, a processor 120 may display information indicating that it is able to make a call on a display 130 when a telephone number of user B is input or selected.

In operation 1003, the electronic device 100 may transmit, to the server 300, an acknowledgement request for determining whether the user terminal 200 supports a profile call in response to receiving the input of the contact of user B. For example, when determining that an input contact corresponds to a pre-defined telephone number format, the processor 120 of the electronic device 100 may transmit, to the server 300, an SIP OPTIONS request for determining whether a terminal corresponding to the input contact supports a profile call. In other words, before pushing a send button after inputting a telephone number, the processor 120 may cause a communication circuit 110 to transmit the SIP OPTIONS request to the server 300. In another example, the electronic device 100 may transmit an SIP SUBSCRIBE request to the server 300 for a search for a profile call service. According to an embodiment, when a profile forwarding function corresponds to an RCS function supported by the server 300, it may be verified through an SIP OPTIONS message. For example, the electronic device 100 may determine whether a profile call capability is supported by including a feature tag for supporting a profile call in an SIP message such as the SIP OPTIONS message. For example, the electronic device 100 may define a feature tag for the profile call capability like Table 2 and may determine whether the profile call capability is supported according to whether the feature tag is included in an SIP message.

TABLE 2

| RCS service | tag |
|---|---|
| Profile Call | +g.3gpp.iari-ref="urn%3Aurn-7%3A3gpp-application.ims.iari.rcse.pc" |

The feature tag used in Table 2 may be an example and may be defined as a service specialized in a specific mobile network operator or a specific vendor other than an RCS service. In each case, different feature tags may be defined.

In an embodiment, the electronic device 100 may transmit an SIP OPTIONS message, such as Table 3 below, for a service search and may receive a response message (e.g., 200 OK) such as Table 4 below, thus determining whether the user terminal 200 supports the profile call capability.

TABLE 3

OPTIONS sip:rcsuser2@operatorB.net SIP/2.0
Via: SIP/2.0/UDP pcscf.operatorA.net;branch=z9hG4bK992kda9fd
Max-Forwards: 70
To: Bob <sip:rcsuser2@operatorB.net>
From: <sip:rcsuser1.operatorA.net;user=phone>;tag=1928301774
Call-ID: a84b4c76e66710
CSeq: 1 OPTIONS
Accept-contact: *;
  +g.3gpp.iari-ref="urn%3Aurn-7%3A3gppapplication.ims.iari.rcse.pc";...
Contact:<sip:rcsuser1.operatorA.net>;
  +g.3gpp.iari-ref="urn%3Aurn-7%3A3gppapplication.ims.iari.rcse.pc";...
Accept: application/sdp
Content-Length: 0

Referring to Table 3 above, the electronic device 100 may search a call service supported by the user terminal 200 using two headers in the SIP OPTIONS request. For example, a feature tag (e.g., a feature tag of Table 2) specified for verifying whether the user terminal 200 supports the profile call may be included in an "Accept-contact" header, and a feature tag specified for indicating that the electronic device 100 supports the profile call may be included in a "Contact" header. In another example, the specified feature tag may fail to be included in the "Contact" header.

In operation 1005, the server 300 may transmit the SIP OPTIONS request to the user terminal 200. The user terminal 200 may transmit a response (e.g., 200 OK), such as Table 4 below, to the SIP OPTIONS request to the electronic device 100 via the server 300. In FIG. 10, a response to any request may be displayed by a dotted line for convenience of classification.

TABLE 4

SIP/2.0 200 OK
Via: SIP/2.0/UDP pcscf.operatorA.net;branch=z9hG4bK992kda9fd
To: < sip:rcsuser2@networkB.net>;tag=93810874
From: User1 <sip:rcsuser1@atlanta.com>;tag=1928301774
Call-ID: a84b4c76e66710
CSeq: 63104 OPTIONS
Contact: <sip:rcsuser2@operatorB.net>;
  +g.3gpp.iari-ref="urn%3Aurn-7%3A3gpp-application.ims.iari.rcse.pc"

Referring to Table 4 above, user B (or the user terminal 200) may provide a notification that it is able to provide a profile call service between user A and user B by returning a response including the specified feature tag as a response to whether to support the profile call service of the "Accept-contact" header. In this case, an SIP URI (e.g., sip:resuser2@operatorB.net) of user B may be further included in the "Contact" header.

In operation 1007, the electronic device 100 may verify profile call forwarding settings defined in the electronic device 100. For example, the electronic device 100 may be configured to transmit information about profile images of user A, corresponding to a contact group to which user B belongs, to the user terminal 200 upon originating a profile call and fail to receive information about profile images of user B from the user terminal 200. In this case, operation 1033 of requesting the profile server 400 to transmit the profile images of user B may be skipped in the entire process.

Additionally or alternatively, in operation 1007, the electronic device 100 may verify settings (e.g., user preference) for profile information forwarding for each contact group. For example, only when user B belongs to a specific group set to transmit profile information among contact groups, profile information of user B (e.g., information about profile images) may be transmitted to the user terminal 200. In detail, when a "family" contact group is set to transmit a profile image in the electronic device 100 and when a "friends" contact group is set not to transmit a profile image in the electronic device 100, and when user B belongs to the "family" contact group, the electronic device 100 may transmit profile images (or information about the profile images) to the user terminal 200. However, when user B belongs to the "friends" contact group, the electronic device 100 may make a normal call with the user terminal 200 without transmitting a profile image to the user terminal 200.

In an embodiment, when the electronic device 100 is configured to transmit profile information to all users irrespective of a contact group, it may transmit registered profile information to the user terminal 200 irrespective of a group to which user B belongs. For example, when user A is a corporate body (e.g., a company), company profile information may be transmitted irrespective of a group to which user B belongs. In this case, the transmitted profile information may be common profile information or profile information of the group to which user B belongs. In addition, a description will be given later of examples of a scenario in which user A and user B transmit their profile information according to a group to which they belongs in contacts of their counterpart terminal.

In operation 1009, if necessary, the electronic device 100 may receive an additional image other than a previously set (registered) image. Further, the electronic device 100 may receive the other additional user information, for example, a state message of a user (e.g., a text within a predetermined length), a favorites link, or the like. A menu suitable for inputting such additional information may be separately provided or may be provided together with a dial pad or the like on a display 130 of the electronic device 100.

In operation 1011, the electronic device 100 may transmit, to the server 300, an SIP INVITE request including image information (and additional information). The SIP INVITE request may correspond to a request to generate a session for initializing a profile call according to embodiment. The SIP INVITE request may be represented as a structured document such as Table 5 below.

TABLE 5

INVITE sip:Rcsuser2@operatorB.net SIP/2.0
Via: SIP/2.0/UDP pc33.operatorA.net;branch=z9hG4bK776asdhds
Max-Forwards: 70
To: Bob <sip:Rcsuser2@operatorB.net>
From: Alice <sip:rcsuser1@operatorA.net>;tag=1928301774
Call-ID: a84b4c76e66710
CSeq: 314159 INVITE
Contact: <sip:rcsuser1@pc33.operatorA.net>;
   +g.3gpp.iari-ref="urn%3Aurn-
   7%3A3gpp-application.ims.iari.rcse.pc"
Allow: INVITE,ACK,CANCEL,BYE,REFER,NOTIFY,UPDATE,
OPTIONS
User-Agent:RCS-client/OMA2.0
Accept-Contact: *;
   +g.3gpp.iari-ref="urn%3Aurn-
   7%3A3gpp-application.ims.iari.rcse.pc"
P-Preferred-Identity: <sip:rcsuser1@operatorA.net>
Supported: timer
Content-Type: multipart/mixed;boundary=boundary1
Content-Length: xxx
--boundary71
Content-Type: application/sdp
v=0
o= alice 1323909835 1323909838 IN IP4 10.0.100.189
i=A voice for profile call
c=IN IP4 10.0.100.189
t=0 0
a=sendrecv
m=audio 51256 RTP/AVP 0
m=video 51462 RTP/AVP 31
--boundary1
Content-Type: application/profile-call+xml
Content-Length: XX
<?xml version="1.0" encoding="UTF-8"?>
<rcsencapsule xmlns="urn:gsma:params:xml:ns:rcs:rcs:profilecallinfo">
<rcsprofilecallinfo>
<user-profile uri="sip:rcsuser1@operatorA.net">
   <display-name xml:lang="en">Alice</display-name>
   <freetext xml:lang="en">I'm an Oh </freetext>
   <profile-picture>
      <link>http://www.example.com/alice/myself.jpg</link>
   </profile-picture>
   <profilecall-pictures>
   <profilecall-picture-entry contact-type="family" deliver-type="random">
      <link>http://www.example.com/alice/myfamily1.jpg</link>
      <link>http://www.example.com/alice/myfamily2.jpg</link>
      <link>http://www.example.com/alice/myfamily3.jpg</link>
   </profilecall-picture-entry>
   </profilecall-pictures>
</user-profile>
</rcsprofilecallinfo>
</rcsencapsule>
--boundary1

The SIP INVITE request of Table 5 above may be an example, and, hereinafter, a description will be given of only some headers associated with an embodiment. For example, referring to FIG. 5, the "Accept-contact" may correspond to a feature tag for verifying whether the user terminal 200 supports a profile call. Further, the "contact" may indicate whether the electronic device 100 supports the profile call. A series of information ("v=0, . . . m=video 51462 RTP/AVP 31" or the like) described below the "Content-Type: application/sdp" may indicate information associated with a profile call session. A series of information described below the "Content-Type: application/profile-call+xml" may indicate information about profile images of user A to be provided to the user terminal 200 and additional information. In the embodiment of FIG. 10, it is assumed that information about images among profile information of user A, for example, a URI (e.g., http://www.example.com/alice/myfamily1.jpg) of each image (e.g., myfamily1.jpg) is transmitted.

In an embodiment, when user B belongs to a "friends" group in contacts of user A and when the electronic device 100 is configured to share profile information with only a user who belongs to a "family" group, profile information included in the "Content-Type: application/profile-call+xml" of Table 5 above may be omitted. In this case, information associated with the "Content-Type: application/sdp" about session information of a profile call may be included in the SIP INVITE request.

A <profilecall-picture-entry> item may include properties (e.g., deliver-type) for a transmission type other than properties (e.g., contact-type) for the above-mentioned contact group. For example, when transmitting 3 images included in a request for a profile call to user B, the electronic device 100 may transmit the 3 images in a random order, in order, or in a dedicated order. In the example of Table 5 above, the electronic device 100 may transmit the 3 images in a random order (i.e., a deliver-type: "random"). Herein, the order may be an order of file names, an order of file sizes, or the like. Further, a transmission order may be specified by a user. Of course, other transmission types other than the examples are possible.

In operation 1013, the server 300 may transmit the SIP INVITE request to the user terminal 200. In operation 1015, the user terminal 200 may verify profile call receiving settings. For example, when the user terminal 200 is configured not to display a profile image of a sender upon receiving a profile call, operation 1017 of requesting a profile image of user A and operation 1025 of displaying the profile image of user A may be skipped. When the user terminal 200 is configured not to provide a profile image of a receiver to a sender upon receiving a profile call, operation 1029 of providing a profile image of user B to the profile server 400 at the user terminal 200 and operation 1031 of providing the profile image of user B to the electronic device 100 at the profile server 400 may be skipped. Hereinafter, a description assumes user B is set to use all functions of a profile call.

In operation 1015, the user terminal 200 may verify a service feature tag (e.g., a profile call feature tag) for a profile call and information about profile images of user A from the received SIP INVITE request. In addition, in operation 1015, the user terminal 200 may verify a group (e.g., a family group) to which user A belongs in contacts of user B. For example, the user terminal 200 may determine a contact group to which user A belongs, based on an identifier (e.g., a telephone number, an SIP URI, or the like) of user A (or the electronic device 100) (or the determination operation may be performed after operation 1027 described below).

In operation 1017, the user terminal 200 may request the profile server 400 to transmit profile images of user A, based on information about the obtained profile images.

When receiving a response (e.g., profile image data) to the request from the profile server 400 and obtaining all information (e.g., an image and additional information) associated with the profile call included in the SIP INVITE request, the user terminal 200 may initiate a notification sound, a notification indication, or notification vibration, that is, ringing, for indicating that a request for a profile call is received. In a state where it is unable to display profile information according to an embodiment on a display of the user terminal 200 since the user terminal 200 does not receive all information, when the user terminal 200 initiates notification of a profile call, user B may start to make a call in a state where he or she does not verify information sent by user A at all using the profile call. In this case, since there is not large difference between a normal call and the profile call in terms of user experience (UX), the user terminal 200 may be configured to provide a notification of call reception after obtaining all information included in a request for a profile call or after or concurrently with outputting profile information based on the request for the profile call on the display of the user terminal 200.

In operation 1019, the user terminal 200 may initiate a notification of reception (e.g., a sound, vibration, light emitting diode (LED) ON/OFF, display the reception on the display, or the like). In operation 1021, the user terminal 200 may transmit a 180 ringing message to the server 300. Further, in operation 1025, the user terminal 200 may output a profile image of user A based on the obtained information on the display. As described above, operation 1019, operation 1021, and operation 1025 may be substantially and simultaneously performed.

In operation 1023, the server 300 may transmit the 180 ringing message to the electronic device 100. When receiving the 180 ringing message, the electronic device 100 may recognize that the request for the profile call is normally transmitted to the user terminal 200.

In operation 1027, the user terminal 200 may verify settings associated with sharing a profile image of the user terminal 200 (or user B) when receiving a profile call. In the embodiment, it is assumed that the user terminal 200 is configured to share the profile image of the user terminal 200 when receiving the profile call.

In operation 1029, the user terminal 200 may provide profile images corresponding to a contact group to which user A belongs to the profile server 400. The user terminal 200 may upload an image file stored in a local to the profile server 400, and provide identification information of a previously uploaded image file or may provide link information of an image file uploaded to another server. In addition, similarly to operation 1009, the user terminal 200 may provide additional user information to the profile server 400.

In operation 1031, the profile server 400 may provide the provided profile information (e.g., a link) to the electronic device 100. The electronic device 100 may reply a response to the profile information to the profile server 400. The profile server 400 may transmit a response message to the user terminal 200. Thus, the user terminal 200 may recognize that the electronic device 100 receives profile information of user B.

In operation 1033, the electronic device 100 may request the profile server 400 to transmit the profile information of user B. The profile server 400 may transmit the profile information of user B as a response to the request in operation 1033 to the electronic device 100. In operation 1035, the electronic device 100 may display the profile (image) of user B on the display 130.

User B may verify user A through the image information and the additional information of user A. In operation 1037, user B may accept the profile call. When the profile call is accepted, the user terminal 200 may transmit a response message (200 OK) to the request for the profile call to the server 300. In this case, the response message may be represented as a structured document like Table 6 below.

TABLE 6

SIP/2.0 200 OK
Via: SIP/2.0/UDP
pc33.operatorA.net;branch=z9hG4bKnashds8;received=192.0.2.1
To: Alice <sip:rcsuser1@operatorA.net>;tag=1928301774
From: Bob < sip:Rcsuser2@operatorB.net>;tag=a6c85cf
Call-ID: a84b4c76e66710
CSeq: 314159 INVITE
Contact: <sip:Rcsuser2@operatorB.net>;
　　+g.3gpp.iari-ref="urn%3Aurn-
　　7%3A3gpp-application.ims.iari.rcse.pc"
Require: timer
Session-Expires: 10800;refresher=uac
Allow:
INVITE,ACK,CANCEL,BYE,PRACK,UPDATE,REFER,MESSAGE,
OPTIONS
Content-Type: application/sdp
v=0
o= alice 1323909835 1323909838 IN IP4 10.0.100.189
i=A voice for profile call
c=IN IP4 rcsuser2.operatorB.net
t=0 0
a=sendrecv
m=audio 51646 RTP/AVP 0
m=video 51152 RTP/AVP 31

Referring to Table 6 above, in the response message, an SIP URI (i.e., sip:Resuser2@operatorB.net) of the user terminal 200 and a tag (i.e., +g.3gpp.iari-ref="urn %3Aurn-7%3A3gpp-application.ims.iari.rcse.pc") defined in an "Accept-contact" header of the SIP OPTIONS request may be included in a "Contact" header. Further, a detailed session description for a profile call may be included in the response message.

The server 300 may transmit the response message to the electronic device 100. Receiving the response message, the electronic device 100 may recognize that the profile call between user A and user B is initiated.

In an embodiment, during a call or after the call is terminated, the electronic device 100 or the user terminal 200 may store a profile image transmitted and received upon a profile call connection in its local or may register the profile image with the server 300 and may map the profile image with user information. For example, the user terminal 200 may store a profile image of user A, displayed upon a profile call, in a memory of the user terminal 200 and may map user A registered with a contact DB with the profile image of user A.

In an embodiment, the user terminal 200 may output a pop-up or a screen for verifying whether to store a profile image of user A, or may store the profile image (e.g., confirm the storing of the profile image) depending on a response of user B to the verification or may fail to store the profile image (e.g., reject the storing of the profile image). In another embodiment, when there are settings for profile auto-saving like FIG. 7, the user terminal 200 may automatically store or may fail to store a profile image obtained during a profile call depending on the settings. Additionally, when an obtained profile image of user A is identical to a profile image of user A, which is stored or registered in the user terminal 200, the user terminal 200 may skip storing of the profile image. Alternatively, when synchronization of profile images or contacts between the user terminal 200 and the profile server 400 is set, the user terminal 200 may update a newly obtained profile image of user A to the profile server 400. In the description associated with storing the profile image, although the user terminal 200 is replaced with the electronic device 100, the same operation may be applied. Hereinafter, a description will be given of a scenario of sharing and storing profile information with respect settings of various cases.

Table 7 illustrates settings for a contact group of user A, an image to be transmitted upon a profile call to a user who belongs to a contact group, whether to receive an image of a target, and whether to store an image received from the target. There may be 5 groups such as a family group, a friends group, a colleagues group, a university group, and an unspecified group in contacts of user A.

TABLE 7

| Contract group A | Profile forwarding settings | Profile receiving settings | Profile storing settings |
|---|---|---|---|
| Family | Family pictures 1 to 3 | ○ | ○ |
| Friends | Travel pictures 1 to 3 | ○ | ○ |
| Colleagues | Business cards 1 and 2 | ○ | ○ |
| Universities | default | X | X |
| Unspecified | X | ○ | X |

Table 8 illustrates profile call settings of user B according to an embodiment similarly to the description with reference to Table 7.

TABLE 8

| Contract group B | Profile forwarding settings | Profile receiving settings | Profile storing settings |
|---|---|---|---|
| Family | Family pictures 1 and 2 | ○ | ○ |
| Friends | Travel pictures 1 and 2 | ○ | ○ |
| Colleagues | default | X | X |
| Clubs | Club picture 1 | X | X |
| Unspecified | default | X | X |

In an example where the electronic device 100 of user A originates a profile call according to an embodiment to the user terminal 200 of user B, when user B belongs to a "family" group, the electronic device 100 may transmit family pictures 1 to 3 corresponding to the "family" group and may receive profile information transmitted from the user terminal 200, thus storing the received profile information after the profile call is terminated.

When user B belongs to a "friends" group, the electronic device 100 may transmit travel pictures 1 to 3 corresponding to the "friends" group and may receive profile information transmitted from the user terminal 200, and thus storing the received profile information after the profile call is terminated.

When user B belongs to a "colleagues" group, an originating terminal may transmit business information or business images 1 and 2 corresponding to the "colleagues" group and may receive profile information transmitted from the user terminal 200, and thus storing the received profile information after the profile call is terminated.

When user B belongs to a "universities" group, the electronic device 100 may transmit a default image and may fail to receive profile information transmitted from user B. In another embodiment, although the electronic device 100 receives profile information transmitted from user B, it may fail to output the received information on the display 130 of the electronic device 100. Further, the electronic device 100 may fail to store the received profile information.

When user B belongs to the unspecified group (or when user B attempts to make a profile call to a user who is not registered), the electronic device 100 may fail to transmit a profile image of user A. However, the electronic device 100 may receive profile information sent from user B to verify a target. Herein, depending on settings, the received profile information may fail to be stored.

Similarly to the above-mentioned description, there may be 5 groups (e.g., family, friends, colleagues, clubs, and unspecified groups) in contacts of user B, and the user terminal 200 may transmit a profile between reception and origination and may store profile information of user A, in a similar manner to the above-mentioned settings depending on a contact group of user B. For example, when user B belongs to a "colleagues" group in contacts of user A and when user A corresponds to an unspecified group in contacts of user B, the electronic device 100 may transmit business cards 1 and 2 to the user terminal 200, but the user terminal 200 may fail to receive the business cards 1 and 2. For example, the electronic device 100 may transmit a request for a profile call, including information (a link) about the business cards 1 and 2, but the user terminal 200 may fail to download the business cards 1 and 2 from the profile server 400. However, the user terminal 200 may transmit a default image of user B to the electronic device 100 depending on settings. The electronic device 100 may receive and store the transmitted default image of user B.

Figure 11:
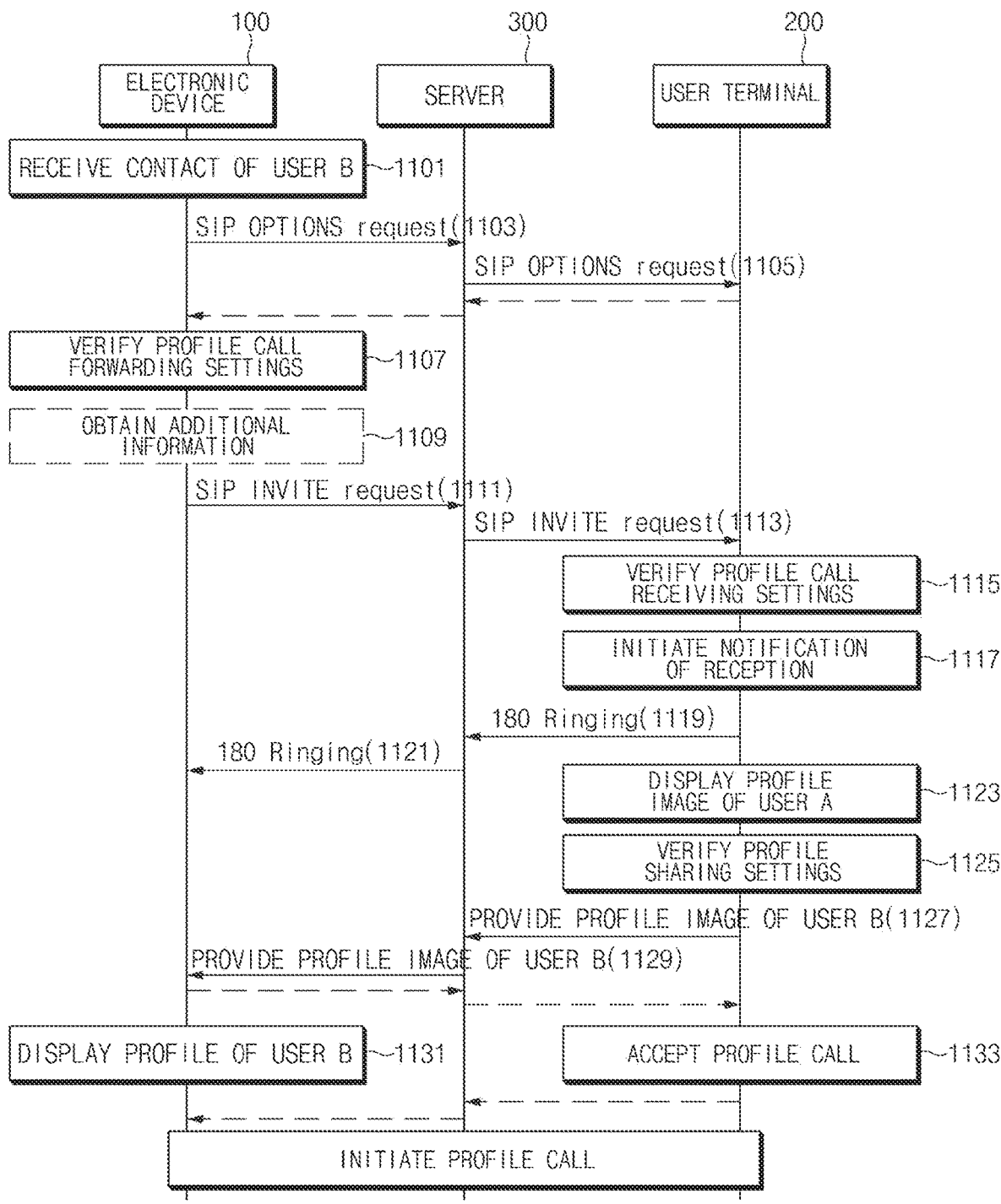
FIG. 11 is a signal sequence diagram illustrating a process of delivering a profile image stored in an electronic device according to an embodiment.

FIG. 11 is a signal sequence diagram illustrating a process of delivering a profile image stored in an electronic device according to an embodiment. Except that a profile call is performed between an electronic device 100 and a user terminal 200 without using a $3^{rd}$ party server (e.g., a profile server 400), a process shown in FIG. 11 may be understood as being similar to a process of FIG. 10. Hereinafter, a description will be omitted of an operation which is the same, corresponds to, or similar to an operation of FIG. 10.

Operations 1101, 1103, 1105, 1107, and 1109 may respectively correspond to operations 1001, 1003, 1005, 1007, and 1009 of FIG. 10.

In operation 1111, the electronic device 100 may transmit an SIP INVITE request including image information (and additional information) to a server 300. The SIP INVITE request may be represented as a structured document such as Table 9. URI information of images is included in an SIP INVITE request such as Table 5 described with reference to FIG. 10, but, in the embodiment of FIG. 11, since the electronic device 100 does not use the profile server 400, it may include image file data in the SIP INVITE request such as Table 9.

TABLE 9

INVITE sip:rcsuser2@operatorB.net SIP/2.0
Via: SIP/2.0/UDP pc33.operatorA.net;branch=z9hG4bK776asdhds
Max-Forwards: 70
To: Bob <sip:rcsuser2@operatorB.net>
From: Alice <sip:rcsuser1@operatorA.net>;tag=1928301774
Call-ID: a84b4c76e66710
CSeq: 314159 INVITE
Contact: <sip:rcsuser1@pc33.operatorA.net>;
   +g.3gpp.iari-ref="urn%3Aurn-
   7%3A3gpp-application.ims.iari.rcse.pc"

TABLE 9-continued

```
Allow: INVITE,ACK,CANCEL,BYE,REFER,NOTIFY,UPDATE,
OPTIONS
User-Agent:RCS-client/OMA2.0
Accept-Contact: *;
    +g.3gpp.iari-ref="urn%3Aurn-
    7%3A3gpp-application.ims.iari.rcse.pc"
P-Preferred-Identity: <sip:rcsuser1@operatorA.net>
Supported: timer
Content-Type: multipart/mixed;boundary=boundary1
Content-Length: xxx
--boundary71
Content-Type: application/sdp
v=0
o= alice 1323909835 1323909838 IN IP4 10.0.100.189
i=A voice for profile call
c=IN IP4 10.0.100.189
t=0 0
a=sendrecv
m=audio 51256 RTP/AVP 0
m=video 51462 RTP/AVP 31
--boundary1
Content-Type: application/profile-call+xml
Content-Length: XX
<?xml version="1.0" encoding="UTF-8"?>
<rcsencapsule xmlns="urn:gsma:params:xml:ns:rcs:rcs:profilecallinfo">
<rcsprofilecallinfo>
    <user-profile uri="sip:rcsuser1@operatorA.net">
            <display-name xml:lang="en">Alice</display-name>
        <freetext xml:lang="en">I'm an Oh </freetext>
            <profile-picture>
            <link>http://www.example.com/alice/myself.jpg</link>
        </profile-picture>
    </user-profile>
</rcsprofilecallinfo>
</rcsencapsule>
--boundary1
Content-Type: image/jpeg
Content-Disposition: render; filename="myfamily1.jpg";
creation-date="Mon, 15 May 2015 15:01:31 +0300"; size=178
... first set of bytes of the profile call picture file JPEG image ..
[IMAGE FILE]
--boundary1
```

Compared with an SIP INVITE request of Table 5, it may be seen that a separate "Content-Type: image/jpeg" item is included in the SIP INVITE request of Table 9, rather than including a <profilecall-pictures> header as a subitem of "Content-Type: application/profile-call+xml". Data about an image file (e.g., myfamily1.jpg) corresponding to a contact group may be included in a "Content-Type: image/jpeg" item.

In operation 1111, the electronic device 100 may transmit the SIP INVITE request including image data to the server 300. In operation 1113, the server 300 may transmit the SIP INVITE request to the user terminal 200.

In operation 1115, the user terminal 200 may verify a service feature tag (e.g., a profile call feature tag) for a profile call and information about profile images of user A from the received SIP INVITE request. This operation may correspond to operation 1015 of FIG. 10. Further, in the embodiment of FIG. 11, since an image file is included in the SIP INVITE request, an operation of obtaining the image file through communication with a separate external server may be skipped. Thus, after operation 1115, in operation 1117, the user terminal 200 may immediately initiate a notification of reception. Operation 1117 may correspond to operation 1019 of FIG. 10. Further, operations 1119, 1121, 1123, and 1125 may respectively correspond to operations 1021, 1023, 1025, and 1027 of FIG. 10.

In operation 1127, the user terminal 200 may transmit a profile forwarding request including a profile image of user B to the server 300. In this case, the profile forwarding request may correspond to an SIP message including image file data similarly to Table 9 above. In operation 1129, the server 300 may transmit the SIP message to the electronic device 100. In operation 1131, the electronic device 100 may obtain a profile image file from the received SIP message and may output the obtained profile image on a display 130. When a profile call is accepted by the user terminal 200 in operation 1131, the profile call between user A and user B may be initiated.

In the embodiment of FIG. 10, profile information may be exchanged through, for example, a $3^{rd}$ party server such as a profile server 400 using a path which is independent of a profile call request/reception path. In the embodiment of FIG. 11, profile information may be exchanged through the same path as a profile call request/reception path, for example, a cellular communication network environment such as the server 300, but the above-mentioned profile file or information forwarding methods may be used in a complex manner. For example, in the embodiment of FIG. 10, the electronic device 100 may include a link of profile images in a profile forwarding request (e.g., an SIP INVITE request), and the user terminal 200 may obtain a profile image file of user A from the profile server 400 based on the link, but may transmit an SIP message including an image file of FIG. 11 to the server 300 when transmitting a profile image of the user terminal 200 (or user B) or may transmit an SIP message including a link of the image file to the server 300. In this case, receiving the SIP message from the server 300, the electronic device 100 may directly obtain an image file from the SIP message or may obtain an image file from a $3^{rd}$ party server based on a link of the SIP message.

Further, several embodiments disclosed in the present disclosure are exemplified as an image file as profile information of the user is transmitted. Within a range implementable with the disclosed several embodiments, the image may be replaced with each of a variety of user content, such as a text, a video, and an emoticon.

The term "module" used in the present disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor, may cause the one or more processors to perform a function corresponding to the instruction.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device, comprising:
a communication circuit configured to support a call function;
a memory; and
a processor configured to:
store a database, the database including contacts of a plurality of users and a plurality of contact groups, and the plurality of contact groups including a first contact group and a second contact group,
store first information about first images corresponding to the first contact group,
store second information about second images corresponding to the second contact group, and
in response to receiving, from a user of the electronic device, a user input for originating a call to a user terminal corresponding to a first user of the first contact group, cause the communication circuit to transmit, to the user terminal the first information about the first images corresponding to the first contact group and a request for a profile call comprising settings for a transmission type of the first image,
wherein the first information about the first images corresponding to the first contact group causes the user terminal to display at least one image among the first images corresponding to the first contact group as a profile image of the user of the electronic device during the call.

2. The electronic device of claim 1, wherein the communication circuit is further configured to support voice over long-term evolution (VoLTE), and
wherein the call uses the VoLTE.

3. The electronic device of claim 1, wherein the processor is further configured to:
in response to the user input for originating the call to the user terminal corresponding to the first user of the first contact group, cause the communication circuit to transmit, to the user terminal, an acknowledgement request for determining whether the user terminal of the first user supports a profile call.

4. The electronic device of claim 3, wherein the acknowledgement request corresponds to a session initiation protocol (SIP) OPTIONS request including a pre-defined tag.

5. The electronic device of claim 1, wherein the first information about the first images corresponding to the first contact group includes a uniform resource identifier (URI) for the images stored in a server.

6. The electronic device of claim 1, wherein the first information about the first images corresponding to the first contact group corresponds to image files stored in the electronic device.

7. The electronic device of claim 1, wherein the processor is further configured to generate the first information about the first images as a structured document.

8. The electronic device of claim 7, wherein the structured document corresponds to a format of any one of an extensible markup language (XML), a JavaScript object notation (JSON), or a session initiation protocol (SIP) INVITE request.

9. The electronic device of claim 1, wherein the communication circuit is further configured to:
receive a uniform resource identifier (URI) for profile images of the first user from a server; and
obtain the profile images of the first user based on the received URI.

10. The electronic device of claim 9, wherein the processor is further configured to output at least one of the profile images of the first user on a display of the electronic device.

11. The electronic device of claim 1, wherein the communication circuit is further configured to receive a session initiation protocol (SIP) message including a profile image file of the first user from the user terminal, and
wherein the processor is further configured to output the profile image file included in the SIP message on a display of the electronic device.

12. A method for providing a profile call service in an electronic device, the method comprising:
storing a database, the database including contacts of a plurality of users and a plurality of contact groups, and the plurality of contact groups including a first contact group and a second contact group;
storing first information about first images corresponding to the first contact group;
storing second information about second images corresponding to the second contact group;
receiving, from a user of the electronic device, a user input for originating a call to a user terminal corresponding to a first user of the first contact group; and
in response to the user input, transmitting, to the user terminal the first information about the first images corresponding to the first contact group and a request for a profile call comprising settings for a transmission type of the first image,
wherein the first information about the first images corresponding to the first contact group causes the user terminal to display at least one image among the first images corresponding to the first contact group as a profile image of the user of the electronic device during the call.

13. The method of claim 12, further comprising:
obtaining a profile image of the first user from the user terminal; and
displaying the obtained profile image on a display of the electronic device.

14. The method of claim 13, further comprising:
storing the profile image of the first user in the electronic device.

* * * * *